United States Patent [19]

Masek

[11] Patent Number: 5,676,596
[45] Date of Patent: Oct. 14, 1997

[54] CONTROLLER FOR ANIMAL ENCLOSURE VENTILATION SYSTEM

[76] Inventor: Tommy Davud Masek, 339 E. 600 So. No. 114, Salt Lake City, Utah 84111

[21] Appl. No.: 543,807

[22] Filed: Oct. 16, 1995

[51] Int. Cl.⁶ .................................................. F24F 11/02
[52] U.S. Cl. ........................ 454/238; 119/448; 137/904; 454/253; 454/255
[58] Field of Search ........................... 454/238, 253, 454/255, 273, 274, 333, 334, 335, 336; 119/448; 137/90, 901

[56] References Cited

U.S. PATENT DOCUMENTS

| | | | |
|---|---|---|---|
| 496,784 | 5/1893 | Hyzer | 454/273 |
| 1,907,928 | 5/1933 | Zaloudek | 454/259 |
| 3,601,030 | 8/1971 | Bryant | 454/238 |

FOREIGN PATENT DOCUMENTS 0 589 532   3/1994   European Pat. Off. ............... 119/448

*Primary Examiner*—Harold Joyce

[57] ABSTRACT

A control device for operating drive motors of closure devices that is reponsive to air pressure differential inside and outside an enclosure and including a housing that will extend through a wall of the enclosure, vanes in the housing and adjustably weighted linkage interconnecting the vanes outside the housing and, depending upon the position of the linkage, operating sealed switches to actuate the drive motors.

10 Claims, 2 Drawing Sheets

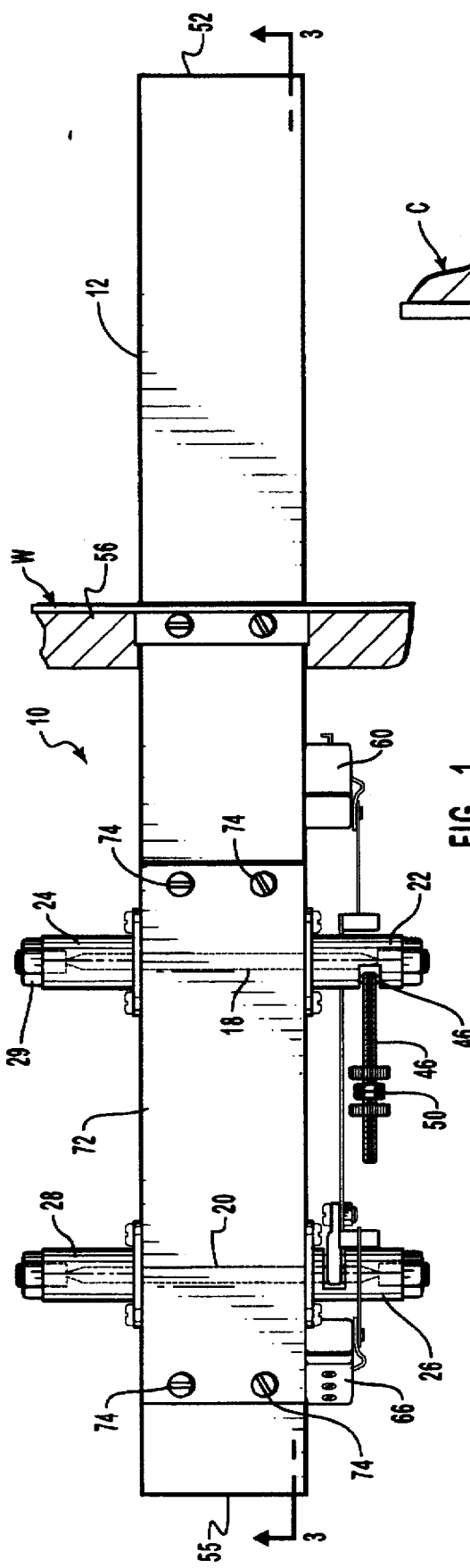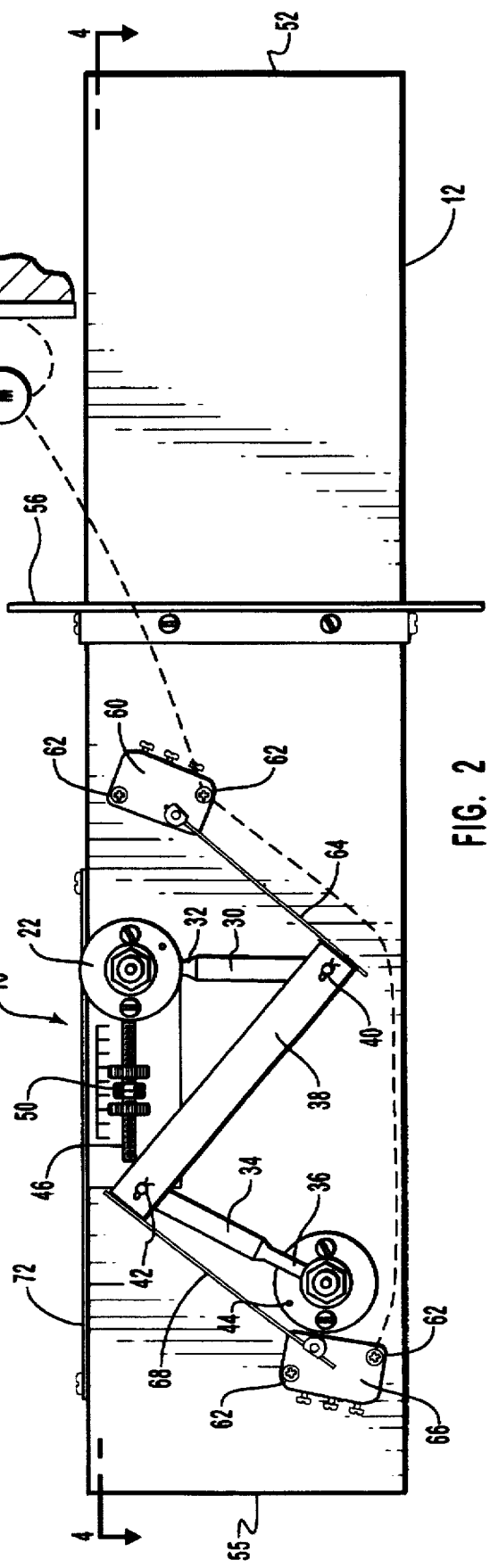

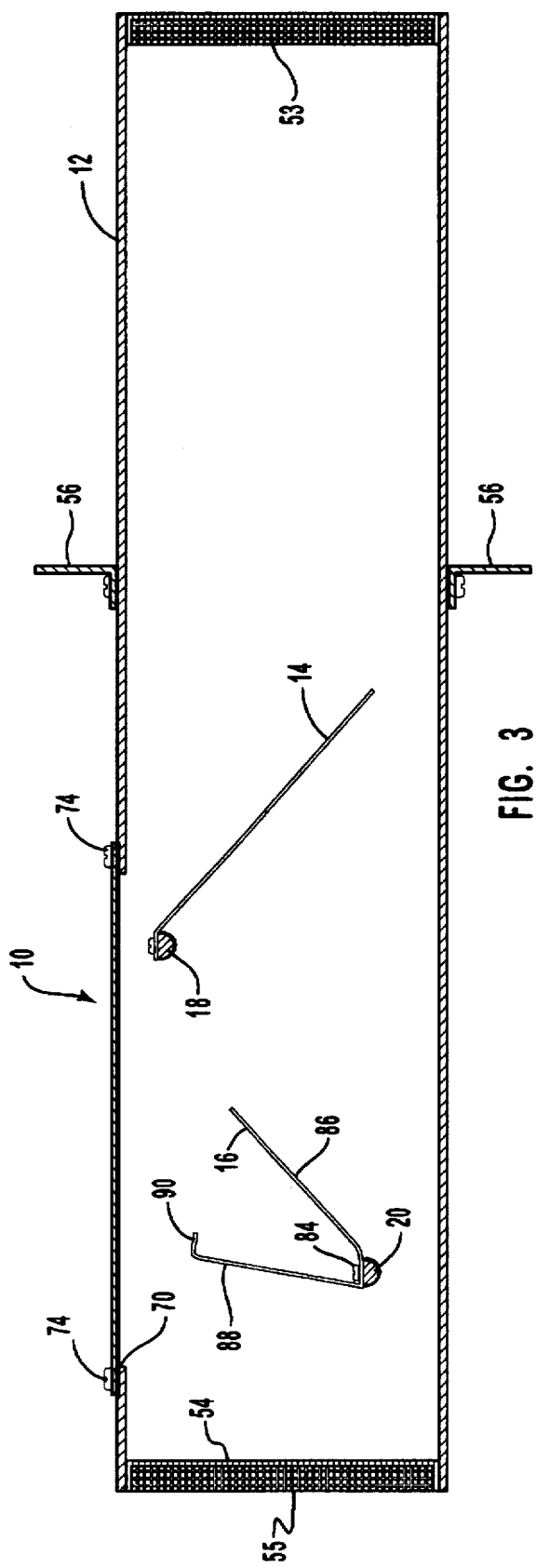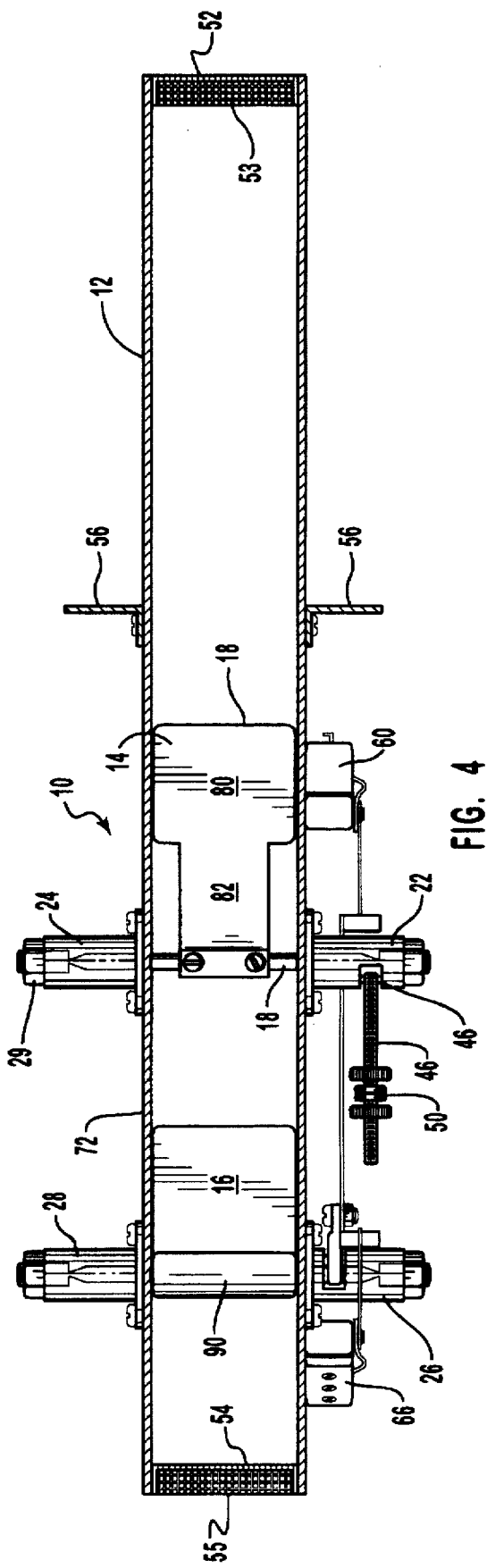

CONTROLLER FOR ANIMAL ENCLOSURE VENTILATION SYSTEM

BRIEF DESCRIPTION OF THE INVENTION

1. Field of the Invention

This invention relates to control devices used in the regulation of air flow through animal enclosures. It is particularly related to control devices for motor drives of curtains, gates, doors and other devices used to regulate air flow through inlet openings into animal enclosures.

2. Prior Art

Animal enclosures, in general and poultry enclosures, in particular, are commonly ventilated to maintain a specified temperature and to provide air circulation. Exhaust fans are typically used to pull air through an enclosure and to discharge the exhaust air outside the enclosure. This generally results in an air pressure reduction within the enclosure that is below the ambient atmospheric pressure. Typically, the air pressure reduction is in the range of from 0.04 to 0.12 inches of water column.

To produce and maintain a desirable circulation pattern within an enclosure it is necessary to maintain an internal static pressure that is within a predetermined range. Therefore, the control device for the motor drive of a curtain, gate, door, or other closure device used to regulate air flow through the enclosure must constantly sense the degree of reduced pressure within the enclosure and provide means to operate the motor drive of the closure device to open or close the closure device as necessary to maintain the desired air flow.

At the present time a method commonly used to properly control the motor drives of closure devices used involves measuring the pressure differential between the interior of the enclosure and the outside ambient pressure using diaphragm-type pressure gauges, such as the Photohelic gauge series manufactured by Dwyer Instruments, Inc.

Typically, diaphragm-type pressure gauges include extensive electronics in their design. In the Photohelic gauge series, for example, the gauges use photocells to detect the movement of a needle that is moved in proportion to the pressure differential. Integrated circuitry converts the sensed movement into signals that operate the drive motors for the closure devices used. The photocells and integrated circuits, which are significantly expensive, because of the complex nature of the sensing system, are subject to deterioration and failure due to the harsh environment of the animal enclosure.

OBJECTS OF THE INVENTION

Principal objects of the present invention are to provide a control device for operating the drive motors of closure devices utilzed to control air flow through animal enclosures and to provide a control device that is relatively unaffected for long periods of time by the harsh environment of such animal enclosures.

Other objects are to provide a control device that does not require costly and fragile electronic circuitry and that is less costly to construct than are the control devices commonly employed to operate the drive motors of closure devices used to regulate air flow through animal enclosures.

FEATURES OF THE INVENTION

Principal features of the invention include vanes arranged to sense air flow through the animal enclosure and to move a proportionate amount in accordance with the air velocity sensed. An adjustable counterweight is used to provide a desired proportionality between motion of linkages connected to the vanes and a desired differential pressure. Sealed microswitches, constituting the only electronics components employed in the control device, sense the motion of the linkages connecting the vanes and provide means to appropriately operate the closure device used.

Additional objects and features of the invention will become apparent from the following detailed description and drawings, disclosing what is presently contemplated as being the best mode of the invention.

THE DRAWINGS

In the drawings:

FIG. 1 is a top plan view of the control device of the invention;

FIG. 2, a side elevation view;

FIG. 3, a horizontal cross-section view, taken on the line 3—3 of FIG. 2; and

FIG. 4, a vertical sectional view taken on the line 4—4 of FIG. 1.

DETAILED DESCRIPTION OF THE INVENTION

Referring now to the drawings:

In the illustrated preferred embodiment the control device of the invention is shown generally at 10. Control device 10 includes a housing 12 in the form of a tube having a rectangular cross-section.

A pair of vanes 14 and 16 are positioned within the housing 12 and the vanes are respectively fixed to shafts 18 and 20. The opposite ends of shaft 18 are respectively journaled in bearing housings 22 and 24 that respectively project from opposite sides of the housing 12. Similarly, the opposite ends of shaft 20 are journaled in bearing housings 26 and 28 that are respectively fixed to and project from opposite sides of the housing 12. A cap 89 on each bearing housing holds the bearings in place.

An arm 30 is fixed to and projects from shaft 18 and swings thorough an opening 32 in the bearing housing 22. Another arm 34 is fixed to and projects from shaft 20 and swings thorough an opening 36 in the bearing housing 24. A link 38 has one end pivotally connected at 40 to the free end of arm 30 and an opposite end pivotally connected at 42 to the free end of arm 34. A stop post 44 projects from housing 20 to limit rotation of arm 34.

A threaded arm 46 also has one end fixed to shaft 18 and projects from shaft 20 to swing thorough an opening 48 provided in the bearing housing 22. A counterweight 50 is threaded onto the threaded arm 46. The arm 46 and counterweight 50 extend from the shaft 18 such that when the control device 10 is positioned to extend through an animal enclosure wall the arm 46 and counterweight 50 bias the front vane 14 upwardly within the housing 12. At the same time arm 34 is rotated towards the inlet end 52 of the housing 12 and through link 38 and arm 34 rear vane 16 is rotated towards inlet end 52 of the housing 12.

Screens 53 and 54 are respctively fitted in and extend, across the inlet 52 and discharge 55 ends of the housing 12 to prevent entry of foreign objects into the housing 12. A flange 56 is fixed to and projects outwardly from the housing 12, intermediate the length of the housing. The flange serves as a mounting means through which screws, nails, or the like, can be inserted to secure the control device 10 to a wall W of an animal enclosure through which the housing 12 is inserted.

A sealed microswitch 60 is fixed by screws 62 to the wall of housing 12 such that a switch actuator wire 64 will be engaged by one end of the link 38. Another sealed microswitch 66 is fixed to the wall of the housing 12 by screws 62 and is positioned to have switch actuator wire 68 engaged by the other end of link 38.

An opening 70 formed in the top of housing 12 provides access to the interior of the housing and the components in the housing. A cover plate 72 fits over and seals the opening 70 and is held in place by screws 74.

All of the components of the control device 10 are preferably made of corrosion resistant materials such as aluminum, brass and stainless steel. The bearings for shafts 18 and 20 are sealed and the vanes 14 and 18 are made of lightweight sheet aluminum so that they will be readily responsive to air flow through the housing 12.

Vane 14 is flat, extends downwardly from shaft 18 and towards the inlet end 52 of housing 12. A lower portion 80 of vane 14 extends essentially side to side in the housing 12 and an upper, more narrow portion 82 allows air flow past the side edges thereof at all times. Air flow is also permitted over the vane 14, at all times.

Vane 16 is generally V-shaped, with the bottom 84 attached to the shaft 20 and with a forward leaf 86 extending essentially side to side in the housing 12. A rear leaf 88 also extends essentially side to side in the housing 12, but is shorter than the leaf 86 and has an upper edge 90 remote from bottom 84 turned towards the upper edge of forward leaf 86. Air flow is permitted beneath the vane 16 at all times.

When the control device 10 is mounted to extend through the wall of an animal enclosure and with the exhaust fans of the enclosure shut down there is virtually no air flow through the housing 20 of the control device 10. At this time the counterweight 50 and the weight distribution of the vanes 14 and 16 will cause link 38 to move down and to the right, as viewed in the drawings and into operating engagement with actuating wire 64 of microswitch 60. Microswitch 60 is a "close" switch and is electrically connected to a drive motor (not shown) of a closure device used to control air flow through an animal enclosure. When the "close" microswitch 60 is actuated the drive motor is actuated to reduce and/or prevent air flow through the animal enclosure.

As the exhaust fans of the animal enclosure start to operate, air pressure within the enclosure is decreased. With a lower pressure within the animal enclosure than without, air flow begins through the housing 20 of control device 10. The vanes 14 and 16 react to the aerodynamic forces and begin to rotate. Depending upon the preset position of counterweight 50, the vanes react more or less quickly to the air flow rise. As the vanes and linkage (arms 30 and 34 and link 38) rotate, the "close" microswitch 60 is deactivated. Since initially the closure device C, i.e. curtain, gate, door, etc., is closed this switch deactivation has no effect.

As the pressure differential increases, the linkage rotates up and to the left, as viewed in the drawings, far enough for the link 38 to engage the actuator wire 68 and to actuate the "open" microswitch 66. This causes the drive motor to begin opening of the closure device. The closure device will continue to open until the pressure differential is reduced to about the desired level set by the position of the counterweight 50. At that point the linkage swings back to the right and deactivates the "open" microswitch 66.

Depending on the air flow dynamics of the animal enclosure and the capacity of the fans, the preset pressure differential will have been reached and the closure device will restrain static. If an overshoot occurs and the pressure change is too great, the "close" microswitch 60 will again be activated to partially or fully close the closure device until the desired pressure is obtained and the "close" microswitch will again be deactivated. There is a range of pressure differential in which neither microswitch is actuated and in which the closure device will restrain static.

Although the typical differential pressure range for an animal enclosure may be 0.04 to 0.12 inches of water the control device 10 can be calibrated for higher or lower pressures. By changing the position of the counterweight 50 along threaded arm 46 and/or by changing the size (weight) of the counterweight 50 the control device 10 can be used for differential pressures down to about 0.02 or up to a few inches of water, as required for different uses and situations.

Although a preferred form of my invention has been herein disclosed it is to be understood that the present disclosure is by way of example and that variations are possible without departing from the subject matter coming within the scope of the following claims, which subject matter I regard as my invention.

I claim:

1. A control device for operating drive motors of closure devices comprising a housing having an inlet end and a discharge end;

means for mounting said housing through a wall of an enclosure, with said inlet end outside said enclosure and said discharge end inside said enclosure;

a pair of spaced apart vanes in said housing;

a pair of spaced apart shafts extending through said housing, each of said vanes being connected to one of said shafts;

bearing means at opposite sides of said housing receiving the opposite ends of each of said shafts;

an arm fixed to and projecting from each of said shafts, outside said housing;

a link pivotally connected at one end to one of said arms and pivotally connected at the other end to the other of said arms;

means biasing the shafts to a vane open position; and a switch means fixed to said housing at each end of said link and engageable by said link to be actuated by movement of said vanes.

2. A control device as in claim 1, wherein the bearing means at opposite sides of the housing receiving opposite ends of the shafts include bearing housings outside the housing of the control device and sealed bearings journaling an end of a shaft inside each bearing housing.

3. A control device as in claim 2, each arm fixed to and projecting from a shaft extends through an opening in a bearing housing.

4. A control device as in claim 3, wherein the means biasing the shafts to a vane open position comprises a rod extending from one of said shafts and having a weight mounted thereon.

5. A control device as in claim 4, wherein the weight is mounted to be adjustably fixed along the length of the rod.

6. A control device as in claim 5, wherein the rod is threaded and the weight is threaded onto the rod.

7. A control device as in claim 6, further including stop means limiting rotation of the arms.

8. A control device as in claim 7, wherein a forward one of said vanes extends downwardly in said housing and forwardly towards the inlet end of said housing.

9. A control device as in claim 8, wherein the other of said vanes is a rear vane that is V-shaped, with the junction of leafs of said V connected to the other of said shafts in the housing and a forward leaf being longer than the other leaf and said rear vane extending upwardly into said housing frown said other of said shafts.

10. A control device as in claim 9, wherein all components are made of corrosion resistant materials and the vanes are made of lightweight materials to be easily pivoted by air flow through said housing.

* * * * *